US010551160B2

(12) United States Patent
Xue et al.

(10) Patent No.: US 10,551,160 B2
(45) Date of Patent: Feb. 4, 2020

(54) COMPREHENSIVE THREAD CHECKING FIXTURE

(71) Applicant: CITIC Dicastal CO., LTD, Qinhuangdao (CN)

(72) Inventors: Bowen Xue, Qinhuangdao (CN); Xiuwei Wang, Qinhuangdao (CN); Jiangtao Zhou, Qinhuangdao (CN); Jiandong Guo, Qinhuangdao (CN)

(73) Assignee: CITIC DICASTAL CO., LTD, Qinhuangdao, Hebei (CN)

( * ) Notice: Subject to any disclaimer, the term of this patent is extended or adjusted under 35 U.S.C. 154(b) by 178 days.

(21) Appl. No.: 15/938,574

(22) Filed: Mar. 28, 2018

(65) Prior Publication Data
US 2019/0195608 A1    Jun. 27, 2019

(30) Foreign Application Priority Data
Dec. 21, 2017   (CN) .......................... 2017 1 1393513

(51) Int. Cl.
*G01B 3/48*   (2006.01)
*G01B 3/28*   (2006.01)
*G01B 3/26*   (2006.01)

(52) U.S. Cl.
CPC ................ *G01B 3/48* (2013.01); *G01B 3/26* (2013.01); *G01B 3/28* (2013.01)

(58) Field of Classification Search
CPC ............... G01B 3/48; G01B 3/50; G01B 3/52

USPC ...................................................... 33/199 R
See application file for complete search history.

(56) References Cited

U.S. PATENT DOCUMENTS

| 4,864,732 A * | 9/1989 | Landy ...................... G01B 3/50 33/542 |
| 5,383,286 A * | 1/1995 | Kipnes .................. G01B 5/163 33/199 R |
| 2006/0005405 A1* | 1/2006 | Wickham ................ G01B 3/48 33/199 R |
| 2014/0112729 A1* | 4/2014 | Wilkins ................. G01B 5/163 409/66 |
| 2014/0299042 A1* | 10/2014 | Igarashi .................... G01B 3/50 116/208 |
| 2015/0020393 A1* | 1/2015 | Shallcross .............. G01B 5/204 33/199 R |
| 2019/0293401 A1* | 9/2019 | Hara ....................... G01B 5/18 |

FOREIGN PATENT DOCUMENTS

CN            102889843 A     1/2013

* cited by examiner

*Primary Examiner* — George B Bennett
(74) *Attorney, Agent, or Firm* — Calfee, Halter & Griswold LLP

(57) ABSTRACT

Disclosed is a comprehensive thread checking fixture, includes a no-go end, a handle, a measuring column, a measuring sleeve and a jackscrew. The checking fixture not only can be used for detecting the size of the detected threads, but also can be used for detecting the depth of the detected threads, and has the characteristics of simple structure, high detection precision, strong compatibility, low manufacturing cost and the like at the same time.

1 Claim, 3 Drawing Sheets

COMPREHENSIVE THREAD CHECKING FIXTURE

CROSS-REFERENCE TO RELATED APPLICATIONS

This application claims priority to Chinese Patent Application No. 201711393513.3, filed on Dec. 21, 2017, which is hereby incorporated by reference in its entirety.

TECHNICAL FIELD

The present application relates to a checking fixture, and specifically, to a comprehensive thread checking fixture.

BACKGROUND ART

In the automobile industry, thread connection is an important connection means. It is very strict to control threads in the machining field of each part, and the detection on threads not only comprises size detection, but also comprises depth detection. At present, the thread checking fixtures capable of simultaneously detecting the two parameters are almost imported, and they are complex in structure and very high in cost.

SUMMARY OF THE INVENTION

The aim of the present application is to provide a comprehensive thread checking fixture, which not only may be used for detecting the size of the detected threads, but also may be used for detecting the depth of the detected threads.

In order to fulfill the above aim, the technical solution of the present application is: comprehensive thread checking fixture, includes a no-go end, a handle, a measuring column, a measuring sleeve and a jackscrew, wherein the no-go end includes a thread no-go gauge, a transition rod and a connecting rod II, the left side of the thread no-go gauge is connected with the transition rod, the left side of the transition rod is connected with the connecting rod II, and the thread no-go gauge, the transition rod and the connecting rod II form a whole.

The measuring column includes a connecting rod I, a scale bar, an open slot and a thread go gauge, wherein the left side of the connecting rod I is connected with the right side of the scale bar, the open slot is formed in the scale bar, and the right side of the thread go gauge is connected with the left side of the scale bar; and the connecting rod I, the scale bar, the open slot and the thread go gauge form a whole.

The measuring sleeve includes a bottom surface, a sleeve, an end face, a sliding sleeve and a top surface, wherein the bottom surface is located on the left side of the sleeve, the end face is located on the right side of the sleeve, and the sliding sleeve is arranged between the end face and the top surface; an opening having the depth of 6 mm and the angle of 90 degrees is formed from the top surface to the left side; and the bottom surface, the sleeve, the end face, the sliding sleeve and the top surface form a whole.

The sliding sleeve is matched with the scale bar, and the matched clearances is 0.005 mm; the jackscrew is mounted on the measuring sleeve, and the top of the jackscrew is matched with the open slot; when the right side of the thread go gauge is attached to the end face, the height difference between the left end face of the thread go gauge and the bottom surface is ½ pitch, and the top surface of the measuring sleeve is superposed with the scale 0 on the scale bar; the scale line on the scale bar is put within the range of the 90-degree opening in the measuring sleeve to facilitate numerical observation; the connecting rod I is connected with the left side of the handle; and the connecting rod II is connected with the right side of the handle.

In the working process, the right side of the thread go gauge is attached to the end face of the measuring sleeve, the bottom surface of the measuring sleeve is flush with the top surface of a detected threaded hole, the handle is rotated to screw the thread go gauge into the detected threaded hole, the position of the top surface of the measuring sleeve on the scale line of the scale bar is observed at the same time, and the depth value of threads can be read; the thread go gauge is screwed out of the detected threaded hole, the thread no-go gauge is screwed into the detected threaded hole, and if the thread no-go gauge is not screwed in, the size of the detected threads is qualified.

The present application not only may be used for detecting the size of the detected threads, but also may be used for detecting the depth of the detected threads, and has the characteristics of simple structure, high detection precision, strong compatibility, low manufacturing cost and the like at the same time.

Figure 1:
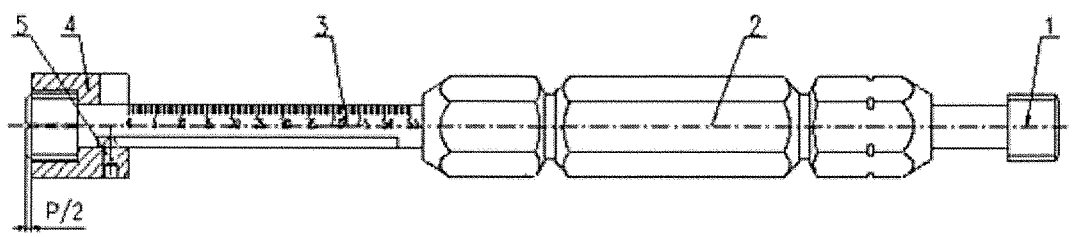
FIG. 1 is a front view of a comprehensive thread checking fixture of the present application.
Figure 2:
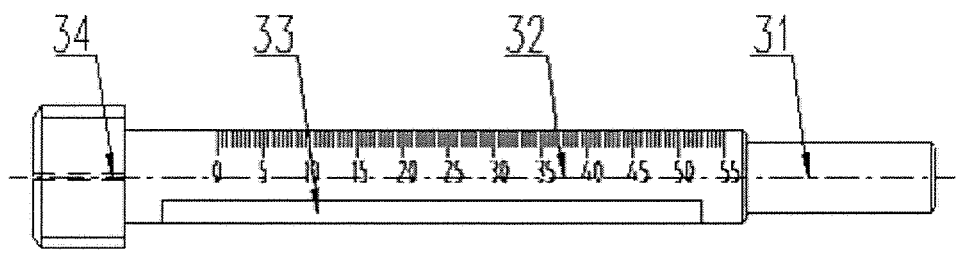
FIG. 2 is a front view of a measuring column of the comprehensive thread checking fixture of the present application.
Figure 3:
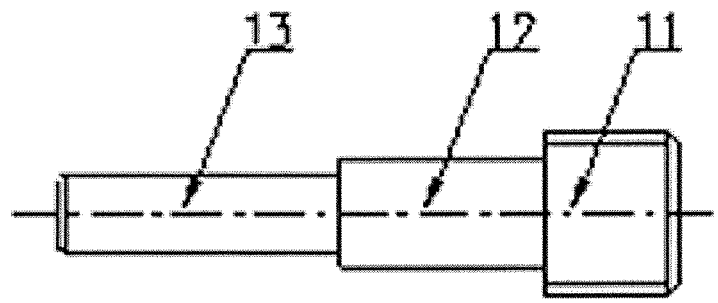
FIG. 3 is a front view of a no-go end of the comprehensive thread checking fixture of the present application.
Figure 4:
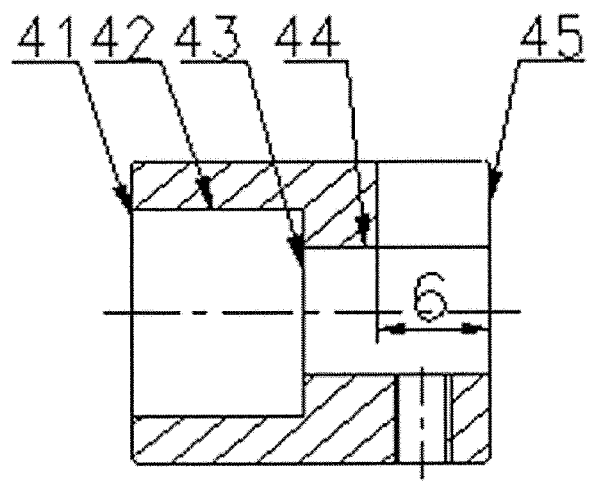
FIG. 4 is a front view of a measuring sleeve of the comprehensive thread checking fixture of the present application.
Figure 5:
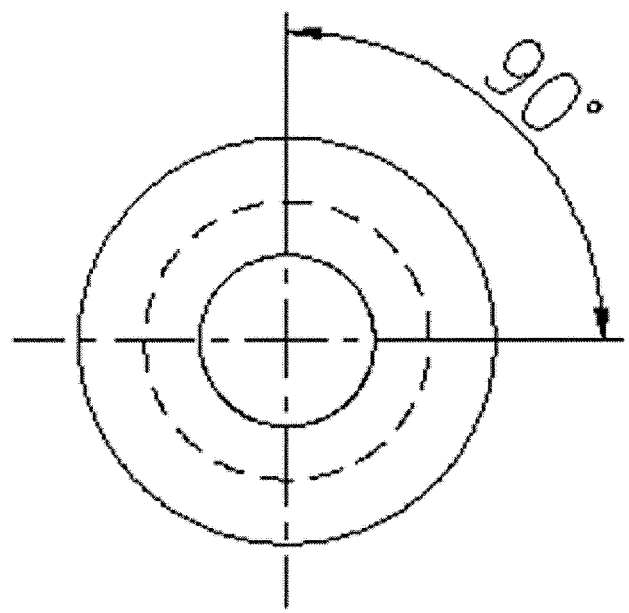
FIG. 5 is a right view of the measuring sleeve of the comprehensive thread checking fixture of the present application.
Figure 6:
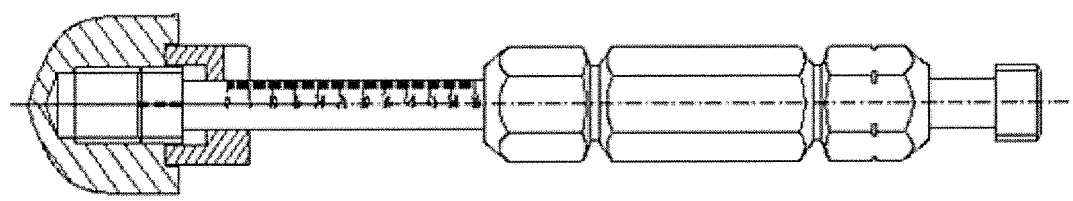
FIG. 6 is a front view when the comprehensive thread checking fixture of the present application detects a workpiece.

In which, 1—no-go end, 2—handle, 3—measuring column, 4—measuring sleeve, 5—jackscrew, 11—thread no-go gauge, 12—transition rod, 13—connecting rod II, 31—connecting rod I, 32—scale bar, 33—open slot, 34—thread go gauge, 41—bottom surface, 42—sleeve, 43—end face, 44—sliding sleeve, 45—top surface.

DETAILED DESCRIPTION OF THE INVENTION

Specific details and working conditions of a device provided by the present application will be described below in combination with the accompanying drawings.

The device includes a no-go end 1, a handle 2, a measuring column 3, a measuring sleeve 4 and a jackscrew 5, the no-go end 1 includes a thread no-go gauge 11, a transition rod 12 and a connecting rod II 13, the left side of the thread no-go gauge 11 is connected with the transition rod 12, the left side of the transition rod 12 is connected with the connecting rod II 13, and the thread no-go gauge 11, the transition rod 12 and the connecting rod II 13 form a whole.

The measuring column 3 includes a connecting rod I 31, a scale bar 32, an open slot 33 and a thread go gauge 34, the left side of the connecting rod I 31 is connected with the right side of the scale bar 32, the open slot 33 is formed in the scale bar 32, and the right side of the thread go gauge 34 is connected with the left side of the scale bar 32; and the connecting rod I 31, the scale bar 32, the open slot 33 and the thread go gauge 34 form a whole.

The measuring sleeve 4 includes a bottom surface 41, a sleeve 42, an end face 43, a sliding sleeve 44 and a top surface 45, the bottom surface 41 is located on the left side of the sleeve 42, the end face 43 is located on the right side of the sleeve 42, and the sliding sleeve 44 is arranged between the end face 43 and the top surface 45; an opening having the depth of 6 mm and the angle of 90 degrees is formed from the top surface 45 to the left side; and the bottom surface 41, the sleeve 42, the end face 43, the sliding sleeve 44 and the top surface 45 form a whole.

The sliding sleeve 44 is matched with the scale bar 32, and the matched clearances is 0.005 mm; the jackscrew 5 is mounted on the measuring sleeve 4, and the top of the jackscrew 5 is matched with the open slot 33; when the right side of the thread go gauge 34 is attached to the end face 43, the height difference between the left end face of the thread go gauge 34 and the bottom surface 41 is ½ pitch, and the top surface 45 of the measuring sleeve 4 is superposed with the scale 0 on the scale bar 32; the scale line on the scale bar 32 is put within the range of the 90-degree opening in the measuring sleeve 4 to facilitate numerical observation; the connecting rod I 31 is connected with the left side of the handle 2; and the connecting rod II 13 is connected with the right side of the handle 2.

In the working process, the right side of the thread go gauge 34 is attached to the end face 43 of the measuring sleeve 4, the bottom surface 41 of the measuring sleeve 4 is flush with the top surface of a detected threaded hole, the handle 2 is rotated to screw the thread go gauge 34 into the detected threaded hole, the position of the top surface 45 of the measuring sleeve 4 on the scale line of the scale bar 32 is observed at the same time, and the depth value of threads can be read; the thread go gauge 34 is screwed out of the detected threaded hole, the thread no-go gauge 11 is screwed into the detected threaded hole, and if the thread no-go gauge 11 is not screwed in, the size of the detected threads is qualified.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. A comprehensive thread checking fixture, comprising a no-go end, a handle, a measuring column, a measuring sleeve and a jackscrew, the no-go end comprises a thread no-go gauge, a transition rod and a connecting rod II, the left side of the thread no-go gauge is connected with the transition rod, the left side of the transition rod is connected with the connecting rod II, and the thread no-go gauge, the transition rod and the connecting rod II form a whole;

the measuring column comprises a connecting rod I, a scale bar, an open slot and a thread go gauge, wherein the left side of the connecting rod I is connected with the right side of the scale bar, the open slot is formed in the scale bar, and the right side of the thread go gauge is connected with the left side of the scale bar; the connecting rod I, the scale bar, the open slot and the thread go gauge form a whole;

the measuring sleeve comprises a bottom surface, a sleeve, an end face, a sliding sleeve and a top surface, wherein the bottom surface is located on the left side of the sleeve, the end face is located on the right side of the sleeve, and the sliding sleeve is arranged between the end face and the top surface; an opening having the depth of 6 mm and the angle of 90 degrees is formed from the top surface to the left side; the bottom surface, the sleeve, the end face, the sliding sleeve and the top surface form a whole;

the sliding sleeve is matched with the scale bar, and the matched clearances is 0.005 mm; the jackscrew is mounted on the measuring sleeve, and the top of the jackscrew is matched with the open slot; when the right side of the thread go gauge is attached to the end face, the height difference between the left end face of the thread go gauge and the bottom surface is ½ pitch, and the top surface of the measuring sleeve is superposed with the scale 0 on the scale bar; the scale line on the scale bar is put within the range of the 90-degree opening in the measuring sleeve; the connecting rod I is connected with the left side of the handle; and the connecting rod II is connected with the right side of the handle.

\* \* \* \* \*